US007146866B2

United States Patent
Morelli et al.

(10) Patent No.: US 7,146,866 B2
(45) Date of Patent: Dec. 12, 2006

(54) MAGNETOSTRICTIVE STRAIN SENSOR AND METHOD

(75) Inventors: Donald T. Morelli, White Lake, MI (US); Bruno Lequesne, Troy, MI (US); Larry M. Oberdier, Royal Oak, MI (US); Thomas A. Baudendistel, Farmersville, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/973,011

(22) Filed: Oct. 25, 2004

(65) Prior Publication Data

US 2006/0086191 A1  Apr. 27, 2006

(51) Int. Cl.
*G01L 1/12* (2006.01)

(52) U.S. Cl. .................. 73/862.69; 73/763; 73/774; 73/760; 73/779; 73/862.381; 73/862.333; 73/862.331; 73/862.325

(58) Field of Classification Search ................ None
See application file for complete search history.

(56) References Cited

U.S. PATENT DOCUMENTS

| | | | |
|---|---|---|---|
| 4,161,665 A | 7/1979 | Buck et al. | |
| 4,955,241 A | 9/1990 | Schiessle et al. | |
| 5,007,295 A | 4/1991 | Gustafsson et al. | |
| 5,437,197 A | 8/1995 | Uras et al. | |
| 5,686,672 A | 11/1997 | Klauber et al. | |
| 5,902,934 A | 5/1999 | Sprague et al. | |
| 5,905,210 A | 5/1999 | O'Boyle et al. | |
| 5,982,054 A | 11/1999 | Rathore et al. | |
| 6,407,660 B1 | 6/2002 | Bomya | |
| 6,433,688 B1 | 8/2002 | Bomya | |
| 6,484,592 B1 | 11/2002 | Sezaki | |
| 6,586,926 B1 | 7/2003 | Bomya | |
| 6,587,048 B1 | 7/2003 | Bomya | |
| 6,603,307 B1 * | 8/2003 | Sekiya et al. ............... 324/225 |
| 6,622,577 B1 * | 9/2003 | Uras ....................... 73/862.69 |
| 6,698,299 B1 * | 3/2004 | Cripe .................... 73/862.331 |
| 6,941,824 B1 * | 9/2005 | Morelli et al. ........... 73/862.69 |
| 2004/0065156 A1 | 4/2004 | Baudendistel | |
| 2004/0099063 A1 | 5/2004 | Frederick | |
| 2004/0107777 A1 | 6/2004 | Lequesne et al. | |

\* cited by examiner

*Primary Examiner*—Edward Lefkowitz
*Assistant Examiner*—Freddie Kirkland, III
(74) *Attorney, Agent, or Firm*—Scott A. McBain

(57) ABSTRACT

A magnetostrictive strain sensor (10) includes a magnetostrictive core (12) comprising a magnetostrictive material, such as a nickel-iron alloy, able to conduct a magnetic flux and whose permeability is alterable by application of a strain. A conductive coil (14) is proximate the magnetostrictive core (12) to generate the magnetic flux when electrically excited. A shell (16) surrounds the conductive coil (14) and the magnetostrictive core (12) for providing a conductive return path for the magnetic flux. An excitation source (18) is electrically connected to the conductive coil (14) for electrically exciting the conductive coil (14) with an alternating current having a constant magnitude. An in-phase voltage circuit (22) is electrically connected across the conductive coil (14). The in-phase voltage circuit (22) senses an in-phase voltage that is in-phase with the alternating current. The in-phase voltage varies correspondingly to the strain subjected to the magnetostrictive core (12). A processor (24) is operatively connected to the in-phase voltage circuit (22) to determine the strain applied to said magnetostrictive core (12) by comparing the in-phase voltage to a predetermined relationship between strain and in-phase voltage.

8 Claims, 3 Drawing Sheets

MAGNETOSTRICTIVE STRAIN SENSOR AND METHOD

FIELD OF THE INVENTION

The invention relates to magnetostrictive strain sensors and related methods for determining a strain or force applied to same.

BACKGROUND OF THE INVENTION

Magnetostrictive sensors are well known in the prior art. One example of such a sensor is disclosed in U.S. Pat. No. 6,622,577 (the '577 patent) to Uras.

The '577 patent discloses a magnetostrictive force sensor. The sensor includes a hollow tubular member comprising a ferromagnetic material able to conduct a magnetic flux and whose reluctance is alterable by application of a force. A conductive coil is wound around the member to generate the magnetic flux when electrically excited. A current source is electrically connected to the conductive coil for electrically exciting the conductive coil with a constant current. A voltmeter is connected across the conductive coil to measure changes in the voltage arising from changes in the magnetic permeability of the hollow tubular member.

Although the prior art magnetostrictive sensors are useful, there remains an opportunity for a magnetostrictive sensor and method which provides a more sensitive measurement of a force applied to the sensor.

SUMMARY OF THE INVENTION AND ADVANTAGES

The subject invention provides a magnetostrictive strain sensor. The sensor includes a magnetostrictive core comprising a magnetostrictive material able to conduct a magnetic flux and whose permeability is alterable by application of a strain. A conductive coil is proximate the magnetostrictive core to generate the magnetic flux when electrically excited. An excitation source is electrically connected to the conductive coil for electrically exciting the conductive coil with an alternating current having a constant magnitude. An in-phase voltage circuit is electrically connected across the conductive coil. The in-phase voltage circuit senses an in-phase voltage that is in-phase with the alternating current. The in-phase voltage varies correspondingly to the force subjected to the magnetostrictive core.

The subject invention also provides a method of determining a force applied to a magnetostrictive strain sensor. The method includes the steps of subjecting a magnetostrictive core formed of a magnetostrictive material to a strain, electrically exciting a conductive coil proximate the magnetostrictive core with an alternating current having a constant magnitude, and sensing an in-phase voltage across the conductive coil that is in-phase with the alternating current wherein the in-phase voltage varies correspondingly to the force subjected to the magnetostrictive core.

Accordingly, by measuring the in-phase voltage across the conductive coil, a simpler, more sensitive, and more precise measurement of the force applied to the sensor is generated.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
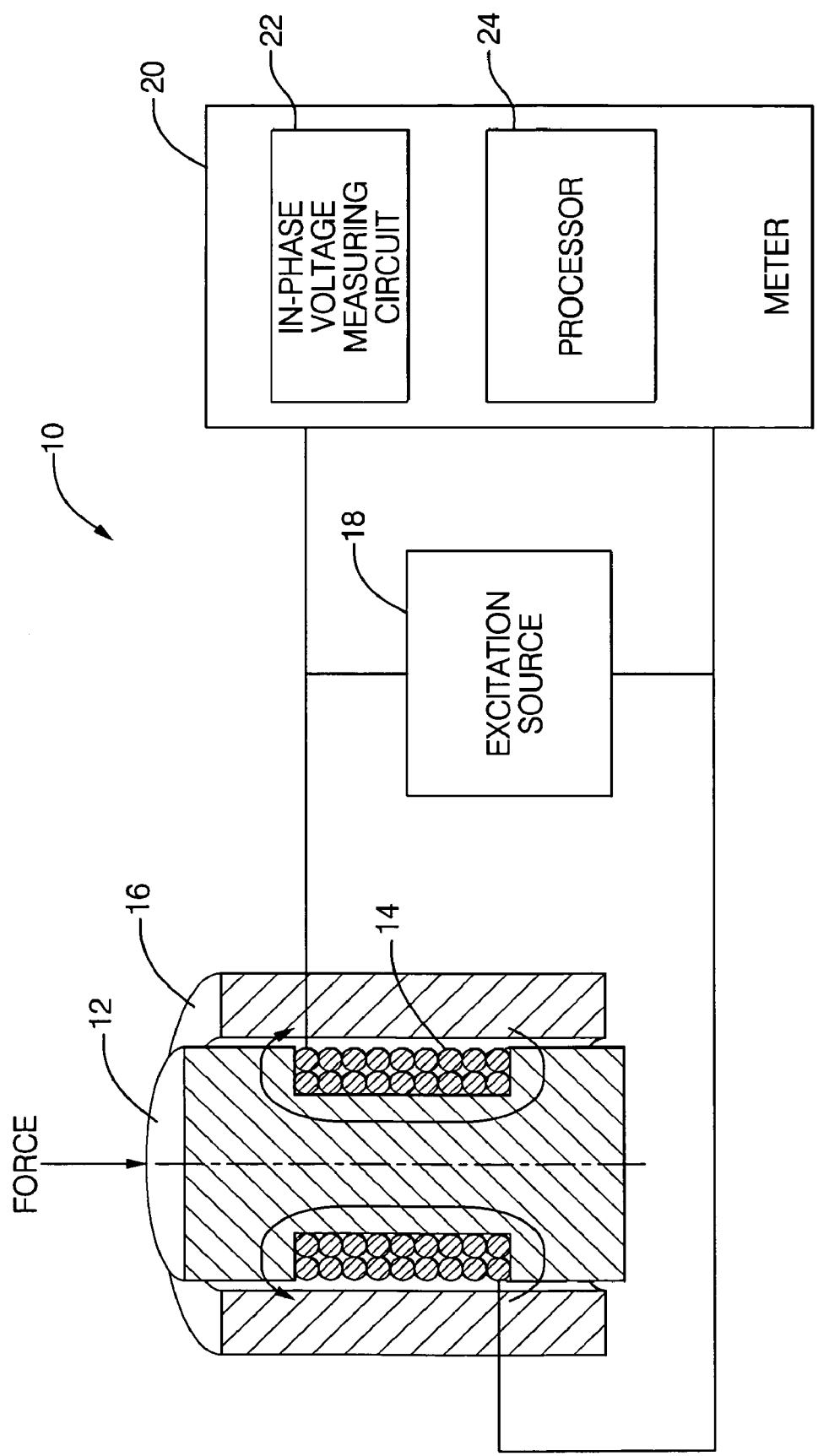
FIG. 1 is a block-diagram of a preferred embodiment of a magnetostrictive strain sensor including a cross-sectional representation of a magnetostrictive core, a conductive coil, and a shell.

A magnetostrictive strain sensor is shown generally at 10 in FIG. 1. The sensor 10 includes a magnetostrictive core 12 comprising a magnetostrictive material able to conduct a magnetic flux. In the preferred embodiment of the present invention, the magnetostrictive material is a nickel-iron alloy comprising about 50–70% nickel and 30–50% iron. However, other magnetostrictive materials are also suitable, including, but not limited to, nickel, iron, rare earth-iron alloys, or any other magnetic material that exhibits an appreciable magnetostrictive coefficient. It is well known to those skilled in the art that magnetostrictive materials exhibit the inverse magnetostrictive effect, also known as the Villari effect. A magnetostrictive core 12 exhibiting the Villari effect has a permeability that is alterable by application of a strain. Those skilled in the art also know which magnetostrictive material is best suited to a strain that is the result of compression or tension.

Sensing strain itself is useful in many circumstances. However, the measure of the source of strain, such as force, torque, pressure, etc., or a combination of these, may be of greater importance. The force, torque, pressure, etc. may create strain on the magnetostrictive core 12 by either compressing or applying tension to the magnetostrictive core 12. One skilled in the art can see how the magnetostrictive core 12 can be placed so as to be subjected to the force, torque, pressure, etc. in such a way that will cause a change in strain level in the magnetostrictive core 12.

The sensor 10 also includes a conductive coil 14 proximate the magnetostrictive core 12. When electrically excited, the coil 14 generates the magnetic flux. In the preferred embodiment, the coil 14 consists of 250 turns of #38 copper wire wound around the conductive coil. However, those skilled in the art realize that numerous variations in the number of turns, size of wire, and type of wire material are also possible. Additionally, the coil 14 may alternatively be disposed inside the core 12. Those skilled in the art also realize that multiple coils 14 may be implemented. Multiple coils 14 are useful to cancel ambient electromagnetic noise or can be connected separately as a transformer with a primary coil and a secondary coil.

In the preferred embodiment, the sensor 10 also includes a shell 16 surrounding the conductive coil 14 and the magnetostrictive core 12. The shell 16 is preferably formed of a material having a high permeability and a high electrical resistivity to provide a magnetically conductive return path for the magnetic flux generated by the coil 14. An example of such a material is steel, however other suitable materials are also known to those skilled in the art. FIG. 1 shows the magnetostrictive core 12 disposed inside the coil 14 and the shell 16 disposed outside the coil. In one alternative embodiment, the magnetostrictive material could alternatively be disposed outside the coil 14 and the non-magnetostrictive material disposed inside the coil 14. In another alternative embodiment, the core 12 and the shell 16 could both be formed of the magnetostrictive material and subject to the strain to be measured.

An excitation source 18 is electrically connected to the conductive coil 14 for electrically exciting the conductive coil 14. The excitation source 18 preferably generates an alternating current having a constant magnitude.

Inasmuch as the core 12 is electrically conductive, eddy currents are induced in the core 12 when the coil 14 is electrically excited. These eddy currents lead to an active power loss which appears as a change in the resistance of the coil 14. This active power loss and the change in apparent resistance $R_{app}$ are functions of the permeability of the core 12. Therefore, measuring the apparent resistance $R_{app}$ across the conductive coil 14 can be used to measure the strain applied to the core 12.

Eddy currents limit the penetration of the magnetic flux in a material, such as the core 12, to a certain skin depth $\delta$. Under ideal conditions, the skin depth $\delta$ is defined as:

$$\delta = \sqrt{\frac{\rho}{\pi f \mu}}$$

where f is the frequency the excitation, $\rho$ is electrical resistivity of the material, and $\mu$ is the permeability of the material.

A flow of magnetic flux is formed in the sensor 10 when the coil 14 is electrically excited. The flow is shown by the curved lines wrapping around the coil 14 in FIG. 1. Inasmuch as the shell 16 is made of a material having a relatively high permeability and a relatively high electrical resistivity (relative to the permeability and resistivity of the core 12), the flow of magnetic flux is dominated by the reluctance of the core 12. The inductance L of the coil 14 can therefore be approximated by $$L \propto \mu_{core} \delta_{core} \propto \mu_{core} \sqrt{\frac{\rho_{core}}{\pi \mu_{core} f}} = A \sqrt{\frac{\mu_{core} \rho_{core}}{\pi f}}$$

where A is a constant, $\mu_{core}$ is the permeability of the core 12, and $\rho_{core}$ is the electrical resistivity of the core 12.

Assuming that the eddy currents are uniformly distributed within the skin depth $\delta$ and not present beyond the skin depth $\delta$, a resistance $R_{eddy}$ of a path of the eddy currents in the core 12 can be estimated by $$R_{eddy} \propto \frac{\rho_{core}}{\delta_{core}} \propto \rho_{core} \sqrt{\frac{\pi \mu_{core} f}{\rho_{core}}} = B\sqrt{\mu_{core} \rho_{core} f}$$

where B is a constant. The apparent resistance $R_{app}$ of the coil 14 can then be determined by multiplying the number of turns N of the coil 14 by the resistance $R_{eddy}$ of a path of the eddy currents, resulting in:

$$R_{app} = N^2 R_{eddy} = BN^2 \sqrt{\mu_{core} \rho_{core} f}$$

A meter 20 is electrically connected to the conductive coil 14 for determining the resistance R of the conductive coil 14 while the conductive coil 14 is electrically excited. The resistance R is the sum of a coil resistance $R_{coil}$ plus the apparent resistance $R_{app}$. That is, $$R = R_{coil} + R_{app}$$

As explained above, the apparent resistance $R_{app}$ of the conductive coil 14 is a direct function of the permeability of the magneto strictive core 12, and any method to measure $R_{app}$ can therefore be used to measure permeability. Inasmuch as the permeability of the coil 14 changes with strain to the magnetostrictive core 12, then the apparent resistance $R_{app}$ of the coil 14 varies correspondingly to the strain subjected to the magnetostrictive core 12.

In the preferred embodiment, as shown in FIG. 1, the meter 20 includes an in-phase voltage circuit 22. The in-phase voltage circuit 22 is electrically connected across the conductive coil 14 and senses an in-phase voltage that is in-phase with the alternating current. Since the current is held at a constant magnitude, this in-phase voltage corresponds to the resistance R of the conductive coil 14. Accordingly, the in-phase voltage may also be referred to as the resistive voltage. If the resistance $R_{coil}$ of the coil 14 is small compared to the apparent resistance $R_{app}$ of the coil 14, the resistance $R_{coil}$ of the coil can be neglected. Therefore, just as with the apparent resistance $R_{app}$, the in-phase voltage varies correspondingly to the strain subjected to the magnetostrictive core 12.

The meter 20 further includes a processor 24 operatively connected to the in-phase voltage circuit 22. The processor 24 determines the strain applied to the magnetostrictive core 12 by comparing the in-phase voltage to a predetermined relationship between strain and in-phase voltage. This predetermined relationship between in-phase voltage and strain can be determined by applying a series of known strains to the core 12 and measuring the in-phase voltages.

Figure 2:
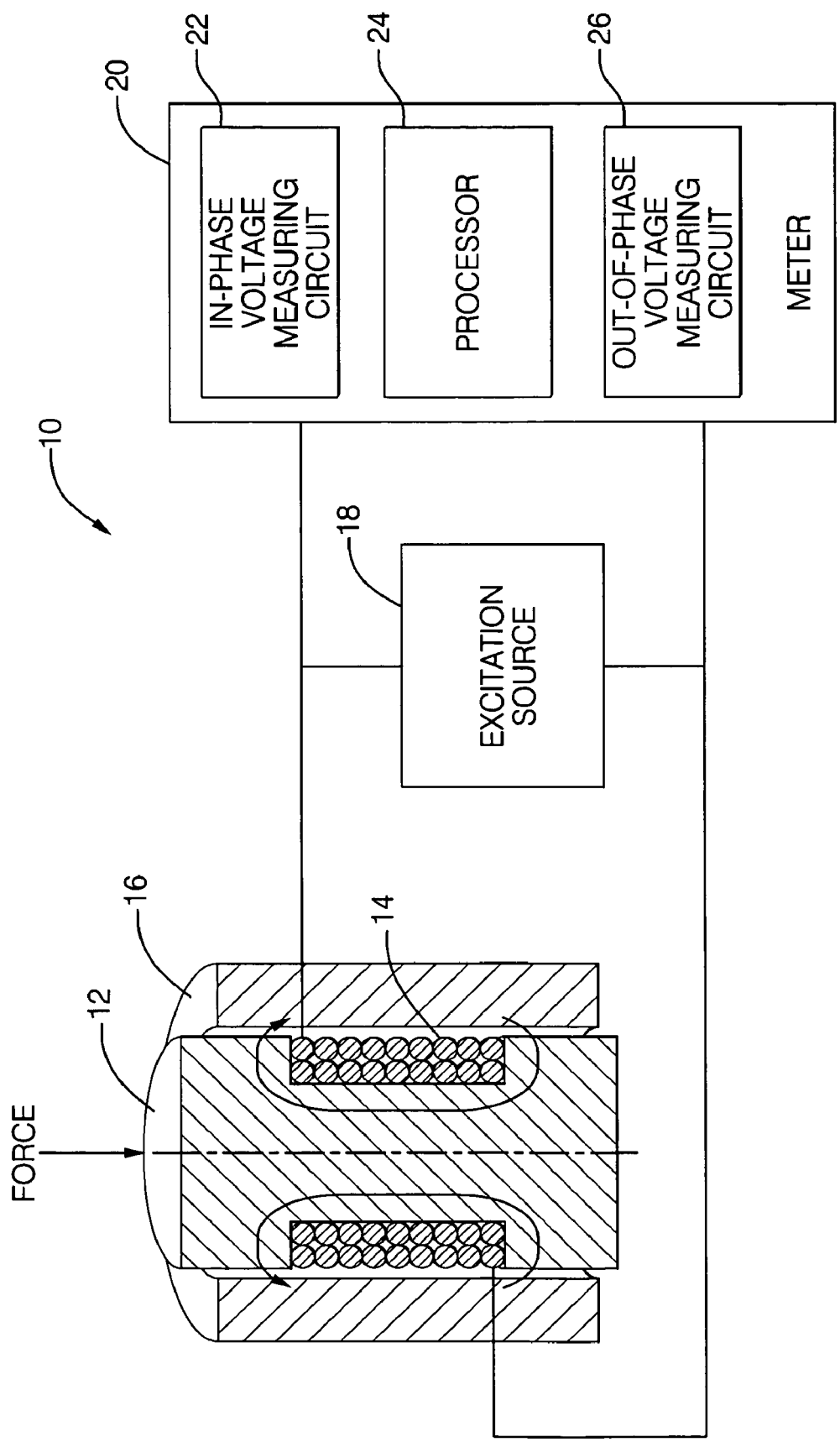
FIG. 2 is a block-diagram of a first alternative embodiment of the magnetostrictive strain sensor.

Referring to FIG. 2, the meter 20 may further include an out-of-phase voltage circuit 26. The out-of-phase voltage circuit 26 senses an out-of-phase voltage that is out-of-phase with the alternating current. This out-of-phase voltage may also be referred to as the inductive voltage. The out-of-phase voltage varies correspondingly to the strain subjected to the magnetostrictive core 12.

The out-of-phase voltage circuit 26 is operatively connected to the processor 24. The strain applied to the magnetostrictive core 12 is determined by comparing the in-phase and out-of-phase voltages to predetermined relationships between strain and in-phase and out-of-phase voltages. A first possible technique for determining the strain in this manner would be to determine the strain using both in-phase and out-of-phase voltage measurements, then to average the two strains. A second possible technique for determining the strain would be to combine the in-phase and out-of-phase voltages algebraically. The result of the algebraic combination is then used to determine the strain. For instance and advantageously, the second possible technique would consist of deriving a product of the in-phase and out-of-phase voltages. This product would also be directly proportional to frequency, rather than a function of either the square root of frequency or the inverse of the square root of frequency, thus simplifying signal processing. Other techniques are known to those skilled in the art.

Figure 3:
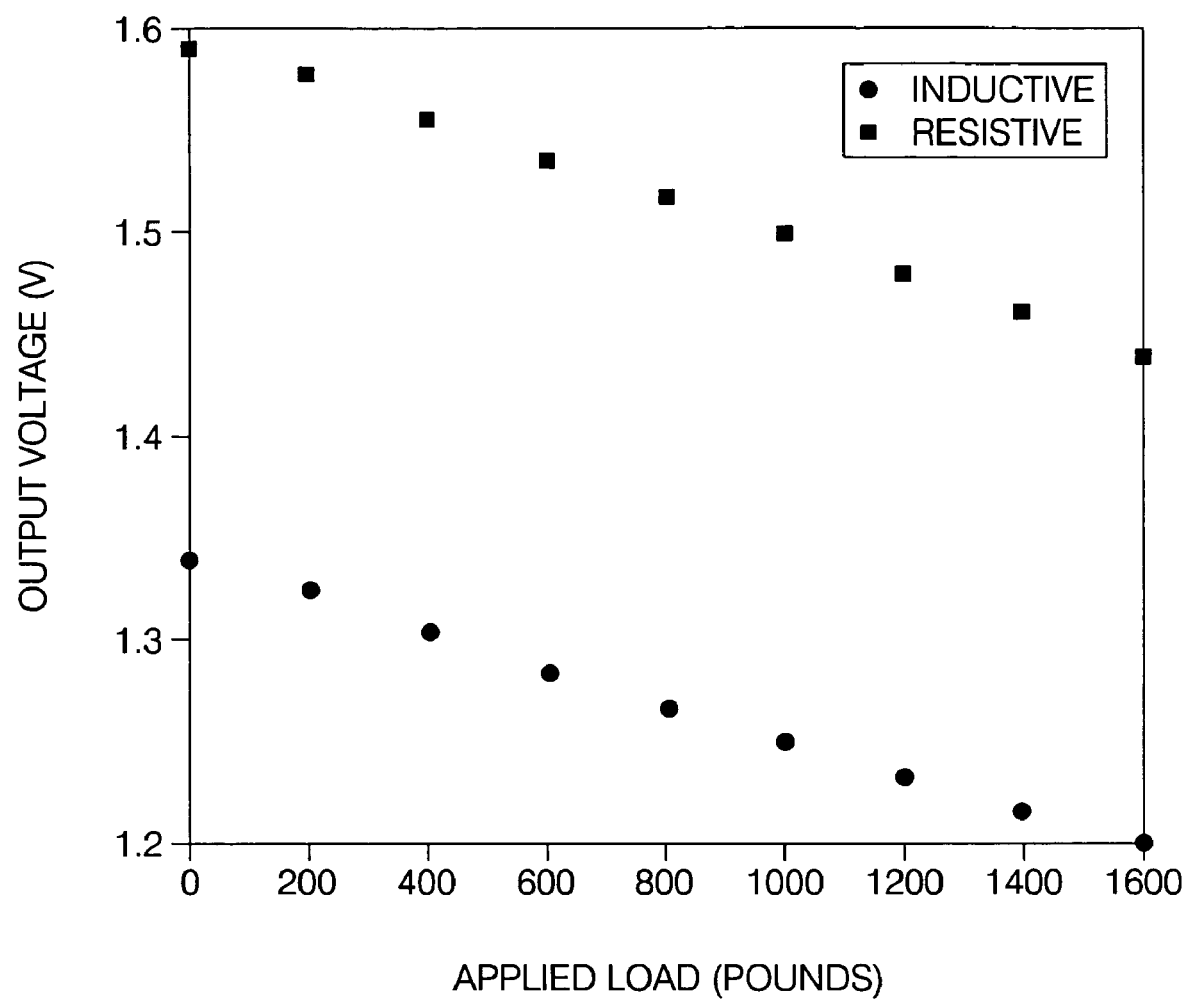
FIG. 3 is a graphical representation of an in-phase output voltage and an out-out-phase output voltage of the magnetostrictive strain sensor when a varying amount of strain is applied to the core.

FIG. 3 illustrates, in graph form, both in-phase (resistive) and out-of-phase (inductive) voltage measurements as various strains are applied to the sensor 10. The resistive voltage measurements span over a greater voltage range, indicating a more sensitive measurement than provided by the inductive voltage measurements.

As implicitly stated above, the subject invention also provides a method of determining a strain applied to a magnetostrictive strain sensor 10. In the preferred embodiment, the method begins with the step of subjecting a magnetostrictive core 12 formed of a magnetostrictive material to a strain. Next, a conductive coil 14 wound around the magnetostrictive core 12 is electrically excited with an alternating current having a constant magnitude. The method continues with the step of sensing an in-phase voltage across the conductive coil 14 that is in-phase with the alternating current. The in-phase voltage varies correspondingly to the strain subjected to the magnetostrictive core 12. The method also includes the step of determining the strain applied to the core 12 by comparing the in-phase voltage to a predetermined relationship between strain and in-phase voltage.

The method may also include the step of sensing an out-of-phase voltage across the conductive coil 14 that is out-of-phase with the alternating current. The out-of-phase voltage varies correspondingly to the strain subjected to the magnetostrictive coil 14. The method of the alternative embodiment further includes determining the strain applied to the core 12 by comparing the in-phase and out-of-phase voltages to predetermined relationships between strain and in-phase and out-of-phase voltages.

The subject invention is described above wherein the excitation source 18 generates the alternating current having the constant magnitude and the in-phase voltage circuit 22 senses the in-phase voltage. However, in an alternative embodiment, the invention could also be implemented where the excitation source 18 generates an alternating voltage having a constant magnitude and an in-phase current circuit (not shown) senses an in-phase current. The in-phase current circuit is connected in series with the coil 14. Thus, the processor 24 determines the strain applied to the magnetostrictive core 12 by comparing the in-phase current to a predetermined relationship between strain and in-phase voltage. Alternatively, the meter 24 determines the apparent resistance $R_{app}$ by utilizing a known magnitude of the alternating voltage with the in-phase current sensed by the in-phase current circuit. Specifically, the apparent resistance $R_{app}$ is determined by dividing the known magnitude of the alternating voltage V by the in-phase current $I_{in-phase}$ ($R_{app}=V/I_{in-phase}$)

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A magnetostrictive strain sensor comprising;
    a magnetostrictive core comprising a magnetostrictive material able to conduct a magnetic flux and whose permeability is alterable by application of a strain,
    a conductive coil wound proximate said magnetostrictive core for generating the magnetic flux when electrically excited,
    an excitation source electrically connected to said conductive coil for electrically exciting said conductive coil with an alternating current having a constant magnitude,
    an in-phase voltage circuit electrically connected across said conductive coil for sensing an in-phase voltage that is in-phase with the alternating current wherein the in-phase voltage varies correspondingly to the strain subjected to said magnetostrictive core, and
    a shell surrounding said conductive coil and said magnetostrictive core for providing a conductive return path for the magnetic flux.

2. A magnetostrictive strain sensor comprising;
    a magnetostrictive core comprising a magnetostrictive material able to conduct a magnetic flux and whose permeability is alterable by application of a strain,
    a conductive coil proximate said magnetostrictive core for generating the magnetic flux when electrically excited,
    an excitation source electrically connected to said conductive coil for electrically exciting said conductive coil,
    a meter electrically connected to said conductive coil for determining an apparent resistance of said conductive coil while said conductive coil is electrically excited wherein the apparent resistance of said conductive coil varies correspondingly to the strain subjected to said magnetostrictive core.

3. A magnetostrictive strain sensor as set forth in claim 2 further comprising a processor operatively connected to said meter for determining the strain applied to said magnetostrictive core by comparing the apparent resistance to a predetermined relationship between strain and apparent resistance.

4. A magnetostrictive strain sensor as set forth in claim 2 wherein said excitation source generates an alternating current having a known magnitude and said meter further comprises an in-phase voltage circuit electrically connected across said conductive coil for sensing an in-phase voltage that is in-phase with the alternating current.

5. A magnetostrictive strain sensor as set forth in claim 4 wherein said meter determines the apparent resistance of said conductive coil utilizing the known magnitude of the alternating current and the in-phase voltage sensed by said in-phase voltage circuit.

6. A magnetostrictive strain sensor as set forth in claim 2 wherein said excitation source generates an alternating voltage having a known magnitude and said meter further comprises an in-phase current circuit electrically connected in series with said conductive coil for sensing an in-phase current that is in-phase with the alternating voltage.

7. A magnetostrictive strain sensor as set forth in claim 6 wherein said meter determines the apparent resistance of said conductive coil utilizing the known magnitude of the alternating voltage and the in-phase current sensed by said in-phase current circuit.

8. A magnetostrictive strain sensor as set forth in claim 3 wherein said coil is wound around said magnetostrictive core.

* * * * *